July 31, 1945.  F. E. BACHMAN  2,380,376
BRAKE HEAD BALANCING AND ATTACHING MEANS
Filed Sept. 25, 1942
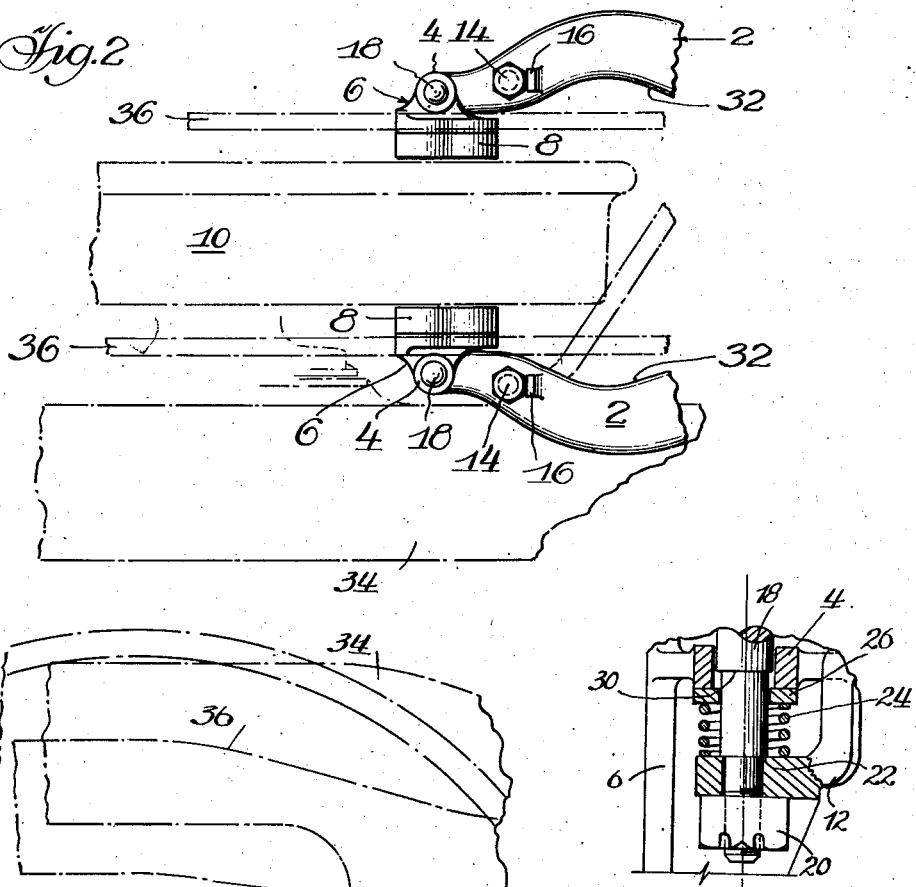
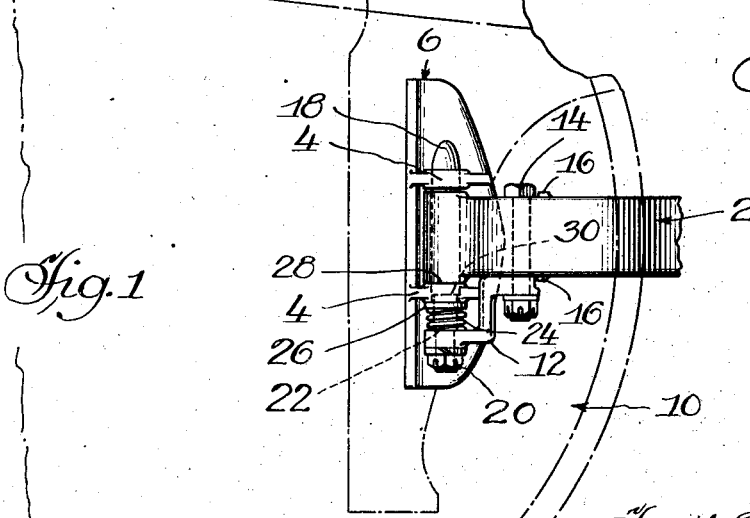
INVENTOR.
Fred E. Bachman
BY
Atty Patented July 31, 1945

2,380,376

UNITED STATES PATENT OFFICE 2,380,376

BRAKE HEAD BALANCING AND ATTACHING MEANS

Fred E. Bachman, Chicago, Ill., assignor to American Steel Foundries, Chicago, Ill., a corporation of New Jersey Application September 25, 1942, Serial No. 459,660

17 Claims. (Cl. 188—212)

My invention relates to railway brake equipment and more particularly to mechanism for frictionally resisting the pivoting of a brake head at its point of connection to an associated brake lever, such mechanism being commonly known as a brake head balancing device.

An object of the invention herein disclosed is to provide an improved brake head balancing device of the generic type disclosed and claimed in the copending application, Serial No. 448,373, filed June 25, 1942, in the name of Carl E. Tack.

A further object of my invention is to design a balancing device suitable for utilization in a rotor brake arrangement in which the brake shoes mounted on the brake heads are formed and arranged for engagement with opposite sides of a rotor mounted on an associated wheel and axle assembly, said rotor being in the form of a special brake disc or being one of the wheels of said assembly.

My invention comprehends a brake head being so connected to the associated lever as to permit the head to accommodate varying angles of application to the braking surfaces of the associated disc or wheel and at the same time to maintain said head in its normal position with respect to the associated lever when released, said brake head comprising spaced lugs receiving therebetween the end of a brake lever and pivotally secured thereto by means of a pin.

A specific object of my invention is the provision of a bracket on the brake lever, said bracket being supported adjacent one of the brake head lugs and receiving an end of the pin, and said bracket affording abutment for one end of a compression spring sleeved over the pin, the opposite end of said spring being engaged with the adjacent brake head lug, and said spring being under compression between said bracket and said lug whereby the lever is frictionally engaged with said lug so that the brake head is retained in its normal position upon release of the lever, while at the same time the brake head will be permitted pivotal movement with respect to said lever in order to accommodate movement of the associated brake surface during braking application of the head thereto.

Still another object of my invention is to design a bracket such as above described which may be readily applied and removed from the brake lever in order to facilitate assembly of the lever and shoe as above described.

A further object of my invention is to design a balancing device such as above described in which the removable bracket associated with the lever may be engaged with the pivot pin connecting the brake head and brake lever, whereby said bracket, said pin, and the associated spring may be handled as a unit, said pivot pin being headless in order to facilitate assembly thereof with the brake head and brake lever while said pin is engaged with the bracket as above described.

In the drawing,

Figure 1 is a side elevation of a brake head and brake lever embodying my invention, and Figure 2 is a top plan view showing a pair of brake levers and the associated brake heads in operative position with respect to the wheel of an associated railway car truck.

Figure 3 is an enlarged fragmentary sectional view taken in a plane bisecting the axis of the brake head pin and illustrating my novel brake pin and bracket assembly.

In both of said views, a portion of the wheel is shown, as well as a portion of the truck frame and brake rigging.

Describing my invention in detail, the brake lever 2 is received between the spaced top and bottom lugs 4, 4 on the brake head generally designated 6 carrying a brake shoe 8 formed and arranged for engagement with the adjacent side of the wheel 10. A bracket 12 is removably secured to the lever 2 by means of the bolt and nut assembly 14, said lever being provided with lugs 16, 16 formed respectively on the top and bottom thereof and formed and arranged to prevent turning of the bolt. It will be apparent that the top lug 16 is alone operative to prevent the turning of the bolt, and said lever 2 is provided with the lug 16 on the bottom thereof in order that said lever may be turned over and applied to the brake shoe at the opposite side of the wheel, thus affording interchangeability of the brake levers 2, 2, as will be readily aparent from a consideration of Figure 2.

A headless pin 18 extends through the portion of the bracket 12 underlying the lower brake head lug 4 and is secured to said bracket by means of a nut 20, said pin comprising a shoulder seated at 22 against the side of the bracket remote from the nut 20.

A coil spring 24 is compressed by and between the bracket 12 and a washer 26 seated against the lower brake head lug 4, said spring thus being operative to urge the brake lever 2 into frictional engagement at 28 with said lower brake head lug 4. It will be readily understood by those skilled in the art that the friction created at 28 will maintain the head in normal position of application on the brake lever when the lever is in released position, as shown in Figure 2.

In assembling my novel brake head balancing device, the washer 26 and the spring 24 are sleeved on the pin 18, and the bracket 12 is then applied to the end of the pin and is secured by means of the nut 20, the washer 26 being urged into engagement with the shoulder 30 (Figure 3) on the pin. It will be apparent that the pin, the bracket, and the spring are thus engaged in such manner that they may be handled as a unit. The brake head 6 may then be inserted between the wheel 10 and the arcuate portion 32 (Figure 2) of the associated brake lever 2 and may be moved along said lever over the lugs 16, 16 which are of limited depth to afford clearance from the lugs 4, 4 on the brake head, and thereafter the pin and bracket may be applied as a unit, the pin being inserted through aligned openings in the lugs 4, 4 and the lever 2, and the bracket being secured to the lever by the bolt and nut assembly 14 whereby the spring 24 is placed under additional compression between the lower lug 4 and the bracket 12. It will be aparent to those skilled in the art that by means of this method of assembly the brake head, the brake lever, and the friction device may be entirely assembled and disassembled from beneath the adjacent end of the car truck indicated at 34, thus avoiding interference with the brake lever actuating pull rods indicated at 36, 36 and also avoiding interference with the end of the adjacent wheel and axle assembly and the associated journal means (not shown).

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake head balancing device, a lever member, a brake head member, top and bottom lugs on one of said members embracing a portion of the other member, a headless pin pivotally connecting said lugs and said portion, a bracket on the last-mentioned member underlying said bottom lug, and resilient means compressed between said bracket and said bottom lug, said pin being retained in assembled relationship by means of a shoulder thereon abutting said bracket.

2. In a brake head balancing device, a lever member, a brake head member, rigid means on one of said members embracing rigid means on the other member, pivot means connecting said rigid means, a bracket fixed to the last-mentioned member, and resilient means compressed between said bracket and certain of said first-mentioned rigid means.

3. In a brake head balancing device, a lever member, a brake head member, top and bottom lugs on one of said members embracing a portion of the other member, a headless pivot pin connecting said lugs and said portion, a bracket fixed to the last-mentioned member and underlying said bottom lug, and resilient means compressed between said bracket and said bottom lug, said resilient means being sleeved on said pin, said pin being removably interlocked with said bracket.

4. In a brake pin assembly, a bracket adapted for securement to an associated brake lever, a pin mounted on the bracket, abutment means sleeved over the pin, and a resilient member under compression between said abutment means and an adjacent portion of the bracket, said pin being provided with means to limit movement of said abutment means therealong in a direction away from the bracket.

5. In a brake pin assembly, a bracket adapted for removable securement to an associated brake lever, a pin removably mounted on the bracket, a washer on the pin, and a resilient member under compression between said washer and an adjacent portion of the bracket, said pin being provided with means to limit movement of said washer therealong in a direction away from the bracket.

6. In a brake head balancing arrangement, a brake head member, a brake lever member, a headless pivot pin connecting said members, and resilient means under compression and adapted to react axially of said pin and oppositely against abutment means on the respective members, said pin being removably engaged with certain of said abutment means.

7. In a brake head balancing device, a lever member, a brake head member, rigid means on one of said members embracing rigid means on the other member, a headless pivot pin connecting said rigid means, a bracket on the last-mentioned member, and resilient means compressed between said bracket and certain of said first-mentioned rigid means, said pin being removably engaged with said bracket.

8. In a brake head support, a brake head member, a lever member, spaced rigid means on one of said members embracing a portion of the other member, abutment means secured to the last-mentioned member, a headless pin connecting said rigid means to said portion, said pin being supported by said abutment means, and resilient means in abutment with said abutment means and the adjacent of said rigid means.

9. In a brake head support, a brake head member, a lever member, spaced rigid means on one of said members embracing a portion of the other member, a bracket secured to the last-mentioned member, a headless pin pivotally connecting said rigid means to said portion, said pin being supported by said bracket, and resilient means sleeved on said pin in abutment with said bracket and the adjacent of said rigid means.

10. In a brake head balancing device, a lever member, a brake head member, alternately arranged overlapping rigid means on said members, pivot means connecting said rigid means, and resilient means under compression between and bearing against certain of the rigid means on one of said members and certain of the rigid means on the other member, the rigid means on each of said members being fixed with respect thereto.

11. In a brake head balancing device, a brake head comprising spaced lugs, a lever extending between said lugs, a headless pin pivotally connecting said lever to said lugs, a bracket on said lever adjacent one of said lugs and affording support for said pin, and resilient means under compression between said bracket and said lug.

12. In a brake head support, a brake head member, a lever member, spaced rigid means on one of said members embracing a portion of the other member, a bracket removably secured to the last-mentioned member, a headless pin connecting said rigid means to said portion, said pin being supported by said bracket, and resilient means in abutment with said bracket and the adjacent of said rigid means.

13. In a brake head support, a brake head member comprising spaced lugs, a lever member received between said lugs, a bracket removably connected to said lever member, and a headless pin pivotally connecting said lugs to said lever, said pin being supported by said bracket, said removable connection including a bolt and nut assembly extending through a portion of said bracket and through said lever member, and means on said lever member for engagement with the head of said bolt to prevent rotation thereof.

14. In a brake head balancing device, a brake head member comprising spaced lugs, a lever member received therebetween, pivot means connecting said lugs to said lever member, said lever member being frictionally engaged with the adjacent surface of one of said lugs, a bracket joining said lever in fixed relation thereto at a point spaced longitudinally thereof from said lugs, and resilient means under compression and reacting in opposite directions against the bracket and the first-mentioned member whereby said lever member is urged into said engagement.

15. In a brake head support, a brake head member, a brake lever member, rigid means on one of said members embracing a portion of the other member, and a headless pin pivotally connecting said rigid means to said portion and removably supported from one of said members.

16. In a brake head support, a brake head member, a lever member, spaced rigid means on one of said members embracing a portion of the other member, a bracket removably secured to the last-mentioned member, and a headless pin connecting said rigid means to said portion, said pin being supported by said bracket.

17. In a brake head support, a brake head member, a lever member, spaced rigid means on one of said members embracing a portion of the other member, a bracket secured to the last-mentioned member, and a headless pin connecting said rigid means to said portion, said pin being supported by said bracket.

FRED E. BACHMAN.